(12) United States Patent
Shen

(10) Patent No.: US 8,885,233 B2
(45) Date of Patent: Nov. 11, 2014

(54) METHOD, SYSTEM, AND APPARATUS FOR A DOCUMENT CAMERA BASED BOOK SCANNER AND READING MACHINE WITH AN AUTOMATIC PAGE TURNER

(71) Applicant: Pathway Innovations and Technologies, Inc., San Diego, CA (US)

(72) Inventor: Ji Shen, San Diego, CA (US)

(73) Assignee: Pathway Innovations and Technologies, Inc., San Diego, CA (US)

( * ) Notice: Subject to any disclaimer, the term of this patent is extended or adjusted under 35 U.S.C. 154(b) by 70 days.

(21) Appl. No.: 13/630,073

(22) Filed: Sep. 28, 2012

(65) Prior Publication Data

US 2013/0077138 A1    Mar. 28, 2013

Related U.S. Application Data

(60) Provisional application No. 61/540,189, filed on Sep. 28, 2011.

(51) Int. Cl.
| | |
|---|---|
| *H04N 1/04* | (2006.01) |
| *H04N 1/40* | (2006.01) |
| *H04N 1/195* | (2006.01) |

(52) U.S. Cl.
CPC .... *H04N 1/19594* (2013.01); *H04N 2201/0081* (2013.01); *H04N 2201/0096* (2013.01); *H04N 2201/0434* (2013.01)

USPC ............ 358/498; 358/471; 358/474; 358/494

(58) Field of Classification Search
None
See application file for complete search history.

(56) References Cited

U.S. PATENT DOCUMENTS

| | | | |
|---|---|---|---|
| 6,459,505 B1* | 10/2002 | Swartz et al. | 358/471 |
| 2003/0063335 A1* | 4/2003 | Mandel et al. | 358/498 |
| 2010/0296138 A1* | 11/2010 | Jakes et al. | 358/494 |
| 2011/0267661 A1* | 11/2011 | Hayes et al. | 358/474 |
| 2012/0290304 A1* | 11/2012 | Al-Hasan | 704/260 |

* cited by examiner

*Primary Examiner* — Marivelisse Santiago Cordero
*Assistant Examiner* — Moustapha Diaby
(74) *Attorney, Agent, or Firm* — RatnerPrestia

(57) ABSTRACT

Disclosed is a portable scanner for digitizing books. The scanner has a first leaf and a second leaf joined to each other at a hinge. A first support member is attached to the first leaf and a second support member is attached to the second leaf. The support members maintain the first leaf at an angle of less than ninety degrees relative to a surface supporting the first leaf. At least one scanning mechanism is connected to one of the first or second leafs. A page turning mechanism flips each page of a book to be scanned and maintain each page in a secure position.

18 Claims, 13 Drawing Sheets

METHOD, SYSTEM, AND APPARATUS FOR A DOCUMENT CAMERA BASED BOOK SCANNER AND READING MACHINE WITH AN AUTOMATIC PAGE TURNER

CROSS REFERENCE TO RELATED APPLICATIONS

This application is related to and claims the benefit of U.S. provisional application Ser. No. 61/540,189 filed on Sep. 28, 2011, the contents of which are incorporated fully herein by reference.

TECHNICAL FIELD

The present subject matter relates to book scanning, digitization and machine-assisted reading.

BACKGROUND

Book scanning is the process of converting physical books into digital media such as images, electronic text, or electronic books (e-books) by using an image scanner. Digital books can be easily distributed, reproduced, and read on-screen. There have been a myriad of image and book scanners. However, they are typically very space inefficient, complex, and expensive.

In an ordinary commercial image scanner, the book is placed on a flat glass plate (or platen), and a light and optical array moves across the book underneath the glass. Alternatively, the binding is cut off or the pages are converted to loose leaf sheets, and the pages may then be fed into a feeder for automated processing. However, this is destructive to the book, requires additional processing, and can be time consuming, especially to re-bind or gather the pages into book format. Obviously, for some books, such potentially destructive methods are not possible and certainly not desired for most books or volumes.

In manual book scanners, the glass plate extends to the edge of the scanner, making it easier to line up the book's spine. Other book scanners place the book face up in a v-shaped frame, and photograph the pages from above. The pages must be turned by hand or by automated paper transport devices. Glass or plastic sheets are usually pressed against the page to flatten it. These book scanners are large, cumbersome and not appropriate for personal use.

Scanning at low resolution, for example 300 dpi, is adequate for conversion to digital text output, but for archival reproduction of rare, elaborate or illustrated books, much higher resolution is necessary. Currently, high-end scanners capable of thousands of pages per hour can cost thousands of dollars, but do-it-yourself (DIY), manual book scanners capable of 1200 pages per hour can be built for hundreds of dollars.

However, none of these scanners combine high resolution, high speed processing in a small footprint device at a reasonable cost for personal use. Additionally, DIY scanners, and even higher end scanners, rely on regular digital cameras to take images of the book pages.

Furthermore, regarding automating of the scanning, page turning is typically complex and error prone. Often, robotic arms are used to effect page turning, necessarily increasing the size and cost of the device. The available devices are not suitable or even optimized for personal use.

There is certainly a need for a personal use book digitizing device. With the prolific use of tablet computing devices like the iPad® and Android® devices, it would be desirable for people to digitize their personal book collections into electronic books and read what they own on the go.

Additionally, automatic page turning is important in order for people to really scan or read a book without the laborious effort to turn every page to effect scanning.

True "reading" of a paper book electronically, i.e. the book being first intelligently recognized by a computer, and then read out loud with audible sound benefits many. At least the blind, visually impaired, and other people who prefer audible books desire such technology. Children or other people who are unable to read books themselves due to disability or time constraints also benefit.

After scanning, software adjusts the document images by lining the images up, cropping the images, picture-editing the images, and converting the document images to text and final e-book form. Human proofreaders usually check the output for errors. Even after capturing the pages, typical Visually Impaired Products (VIP) are normally very bulky and only serve to increase the overall size and cost of the device. Thus, an improved form of book scanning, digitization and machine-assisted reading is desired.

SUMMARY

The instant subject matter provides a solution to cumbersome, generic and commercial-only book and media digitization products. The subject matter may incorporate a highly compact, CMOS or CCD based document imaging device, with two cameras, each capturing one page of a book opened on each side on a V-shaped stand. The device may be connected via a high speed data port, for example USB or firewire, etc., to a computing device. Optionally, the device may be integrated with a tablet computing device. A vacuum suction picker mechanism may be employed to automate and automatically turn pages of books or media placed therein.

The device of the instant subject matter is portable, has a compact footprint, is user-friendly and many customizable features, enabling its use on a personal level for digitizing books. In one embodiment, two CMOS-based cameras perform document imaging for scanning of books, manuscripts, and other media.

Additionally, real-time processing of the acquired images may be performed to quickly create a "book" as the pages are scanned into eBook formats and other supported formats, such Portable Document Format (PDF), and Tagged Image File Format (TIFF). To convert the raw images, optical character recognition (OCR) is used to turn book pages into a digital text format like ASCII or other similar format, which reduces the file size and allows the text to be reformatted, searched, or processed by other applications. Other formats that may be supported by the device include, among others, Comic Book Archive file, DAISY-ANSI/NISO Z39.86, Desktop Author, DjVu, EPUB, eReader, FictionBook (Fb2), Founder Electronics, Hypertext Markup Language, IEC 62448, Mobipocket, Multimedia eBooks, Newton eBook, Open Electronic Package, Plain text files, Plucker, PostScript, and Text Encoding Initiative.

An integrated on-board tablet device further enables operation of the device anywhere, anytime, independent of a computer (PC or a Mac, etc.).

Alternatively or additionally, the device may perform real-time optical character recognition (OCR) processing with audible read out. Such functions enable turning the book scanner into a reading machine. The device may be connected to headphones or an external speaker, or audio may be heard from the built-in speaker.

Following scanning, the digitized books can be submitted to a "locker," in an optional step, on the device or elsewhere (a connected computer, tablet, drive, server, or "cloud" computing device). Book storage may be networked to further enable accessibility, especially if storage is on a server or "cloud" computing device.

Disclosed is a portable scanner for digitizing books. The scanner has a first leaf and a second leaf joined to each other at a hinge. A first support member is attached to the first leaf and a second support member is attached to the second leaf. The support members maintain the first leaf at an angle of less than ninety degrees relative to a surface supporting the first leaf. At least one scanning mechanism is connected to one of the first or second leafs. A page turning mechanism flips each page of a book to be scanned and maintain each page in a secure position.

The portable book scanner can also include a second scanning mechanism connected to one of the first or second leafs, a preview screen, and a first book and second press leaf. The press leafs are pivotable to allow for page turning. Also included is a processor for optical character recognition and a sound generating mechanism for audibly reciting the contents of the book to be scanned.

A further embodiment of the inventive subject matter is an apparatus for capturing book and media images that includes a handheld binder case for supporting a book in an open position, an imager comprising an extendible arm and a lens; and a page flipping apparatus for automated turning or movement of pages or components. The page flipping apparatus has a rocking arm with a vacuum arm and at least one roller arm. The vacuum arm is rotatable in three hundred and sixty degrees. This embodiment can include a means for supporting a book in an open position and an air pump exhaust port. An internal processor scans images obtained via the imager and digitizes the images via optical character recognition. A loud speaker, an image preview means and a connecting port (for connecting peripheral devices, components and machines) can also be added in this embodiment.

BRIEF DESCRIPTIONS OF DRAWINGS

DETAILED DESCRIPTION

Optionally, watermarks may be added when books are scanned. The watermarks may be more visible or discreet, so as to provide owner identifying information, or to act as a deterrent to unauthorized copying and distribution. In a further example, the owner information can be entered into a proprietary or online database to prevent digitized books from being virally distributed online through unauthorized channels. Additional and further digital rights management capability can be added to the device. The applications of the technology of the instant subject matter are almost limitless.

Figure 1:
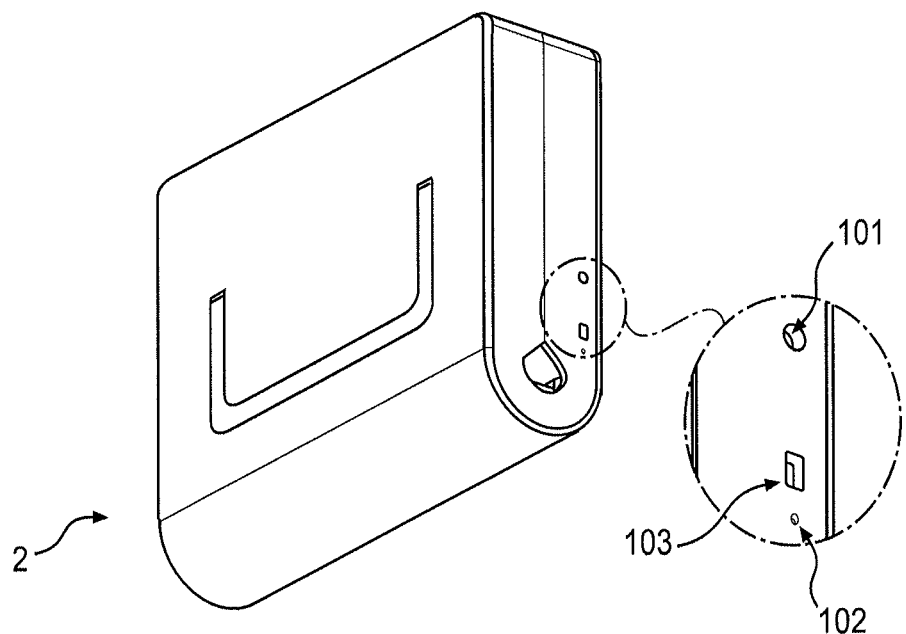
FIG. 1 shows an example book scanning, digitization and machine-assisted reading device, in a closed position.

As seen in FIG. 1, an example book scanning, digitization and machine-assisted reading device, is shown in a closed position. The device profile is similar to a book in a closed position, and has an air pump (air) exhaust hole 101, a USB (insertion) port 103 and a DC (plug) insertion hole 102 to facilitate use of the device with a power supply. Optionally, the device is operated using batteries only.

Figure 2:
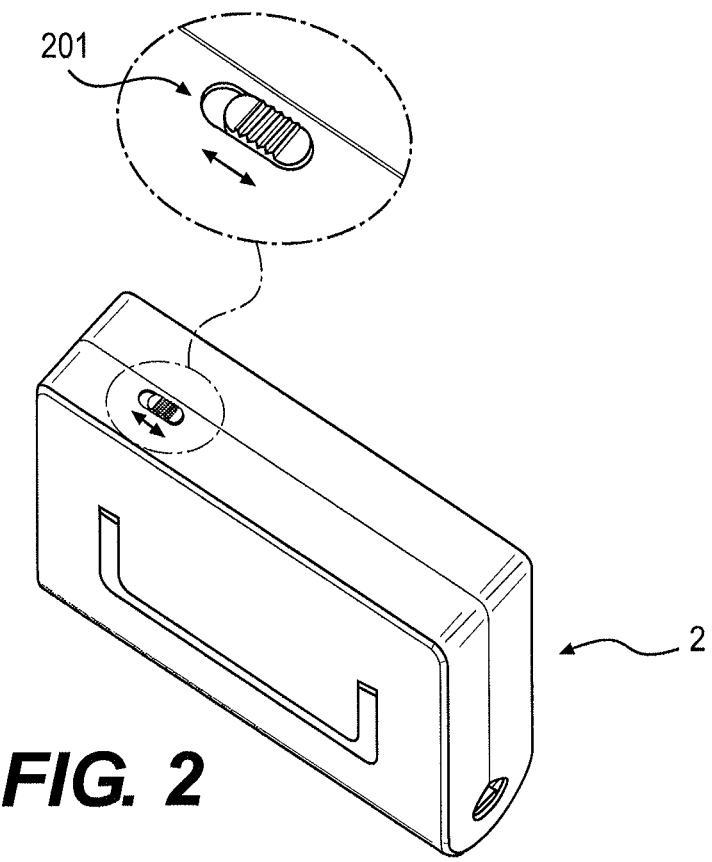
FIG. 2 shows further features of the example book scanning, digitization and machine-assisted reading device, shown in FIG. 1.

FIG. 2 shows further features of the example book scanning, digitization and machine-assisted reading device 2, shown in FIG. 1. For example, a switch 201 is provided. The switch 201 may be a combination mechanical open/closed switch to secure the device in an open or closed position, and an electrical on/off (power) switch to power the device on/off.

Figure 3:
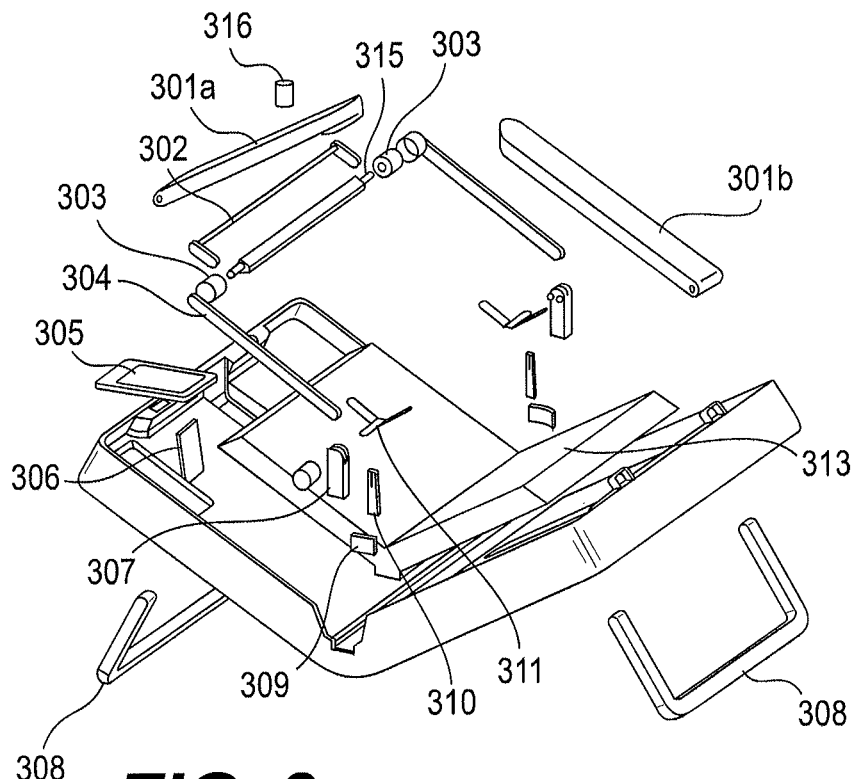
FIG. 3 depicts an example book scanning, digitization and machine-assisted reading device, in an exploded view.

FIG. 3 depicts an example book scanning, digitization and machine-assisted reading device, in an exploded view. The device shows two camera arms 301a and 301b, rotatable about a flipping page rod 302, secured with vacuum arm 315 between two sets of electric rollers 303, mechanical rocking arm 304, book press leaf 311, book press push rod 310, book clamp adjustment piece 309, and mechanical rocking arm prop/strut 307. Flipping book machine support arms 308 provides the device and book 313 placed therein in a position conducive to scanning, and preview screen 305, supported by the display screen prop/strut 306, allows easy view of the screen 305 from a birds-eye viewing angle, so that the user does not need to alternate sitting and standing while operating the device. A built-in speaker 316 further enables user access, and headphone free listening.

Figure 4:
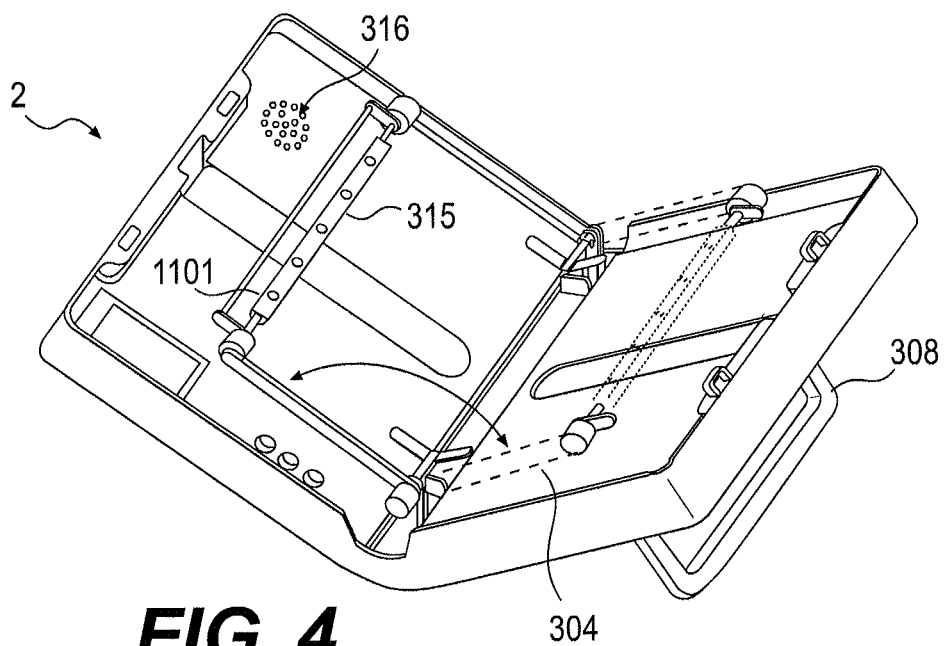
FIG. 4 shows the example device of FIG. 3, in assembled form, in top and bottom views.

As can be seen in FIG. 4, the mechanical rocking arm 304 and related components, move easily from one side of the device to the other, while the device is stably supported by the support arms 308. The vacuum rod 315 has a complete three hundred and sixty five degrees of rotation about a central axis, and vacuum nozzles on one side of it. The speaker 316 is positioned so as to audibly output text read from the scanned book, and should not be affected by the mechanical components.

Figure 5:
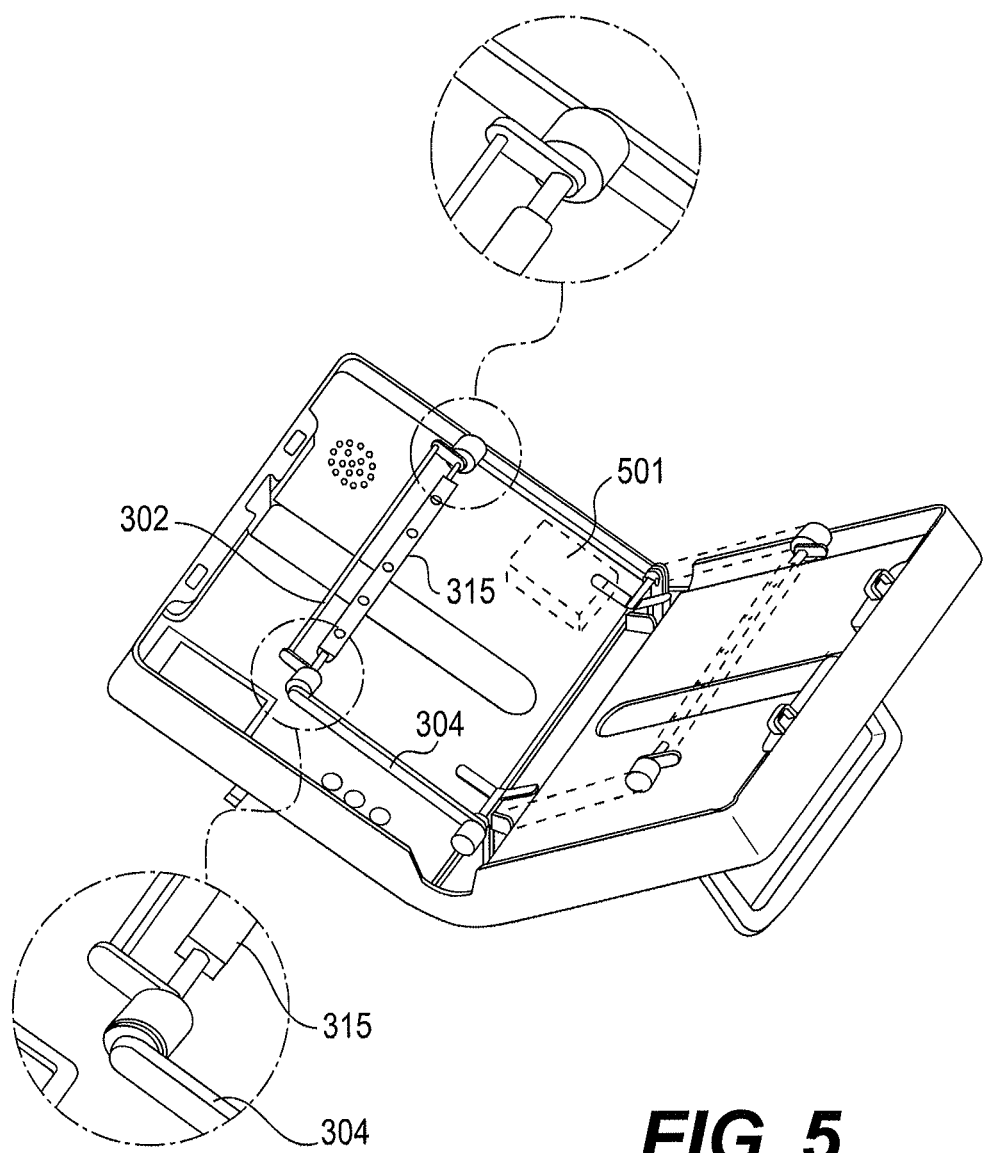
FIG. 5 depicts close-up views of several components seen in FIG. 4.

FIG. 5 depicts close-up views of several components seen in FIG. 4, including the mechanical rocking arm 304, which has a range of motion from the left to the right side of the device, and the rollers 303, page turning rod 302, vacuum arm 315, which may rotate in a complete three hundred and sixty five degrees of rotation together, or independently of each other. The rollers hold the adjoining components securely, while still allowing for smooth and continuous range of movement of the associated components. An air pump 501, connected to the vacuum, is also shown.

Figure 6:
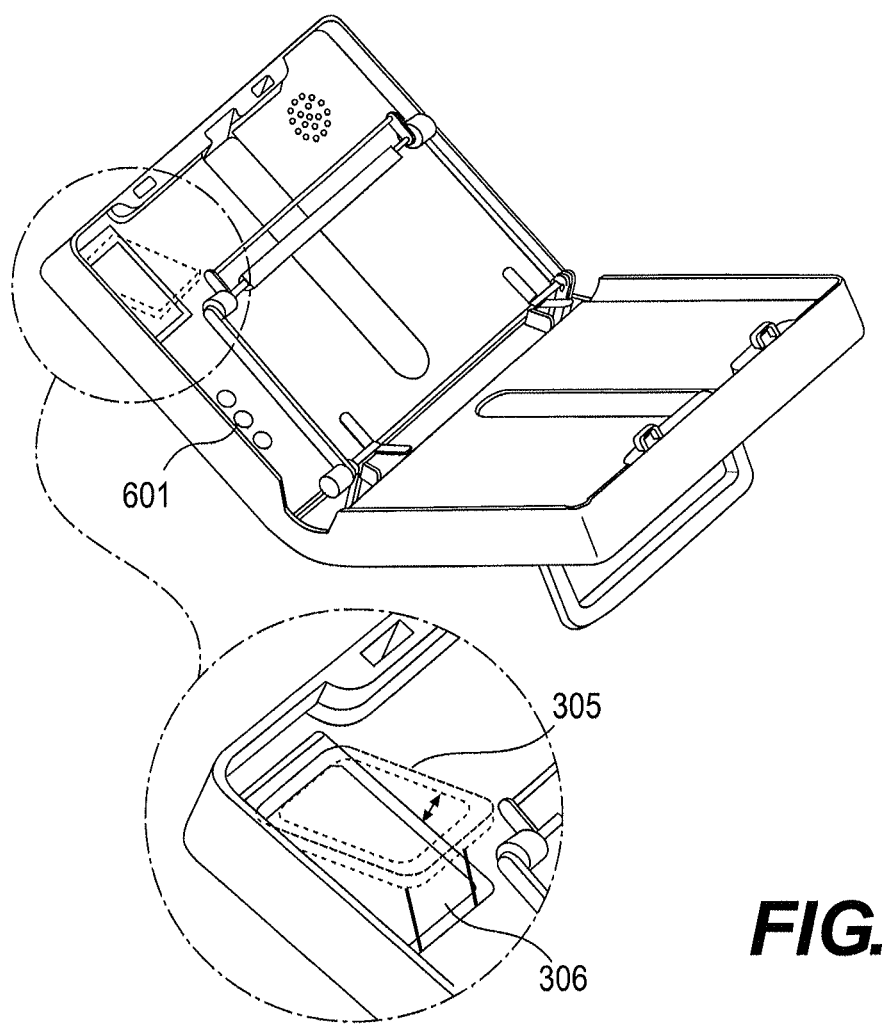
FIG. 6 shows example user operation features of the device.

Further ergonomic features of the device include operation buttons 601, and preview screen 305 and its corresponding prop/strut 306, as seen in FIG. 6, which together enable operation of the device from a seated or standing position. In a folded configuration, the preview screen may be viewed by a seated user; in an extended propped configuration, the preview screen may be viewed by a standing user; in either configuration, the operation buttons 601 are easily accessible.

Figure 7:
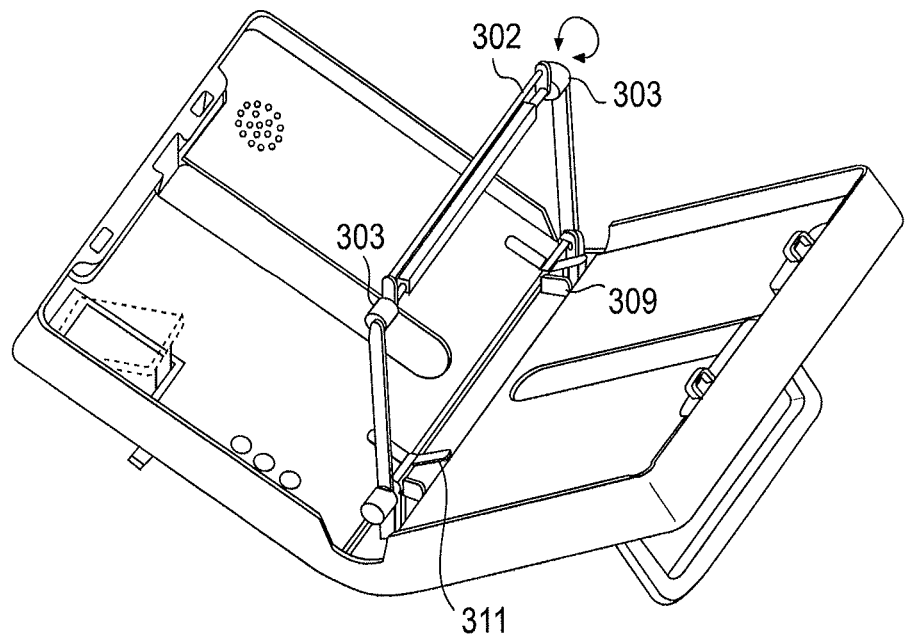
FIG. 7 shows example page-turning features of the device.
Figure 8:
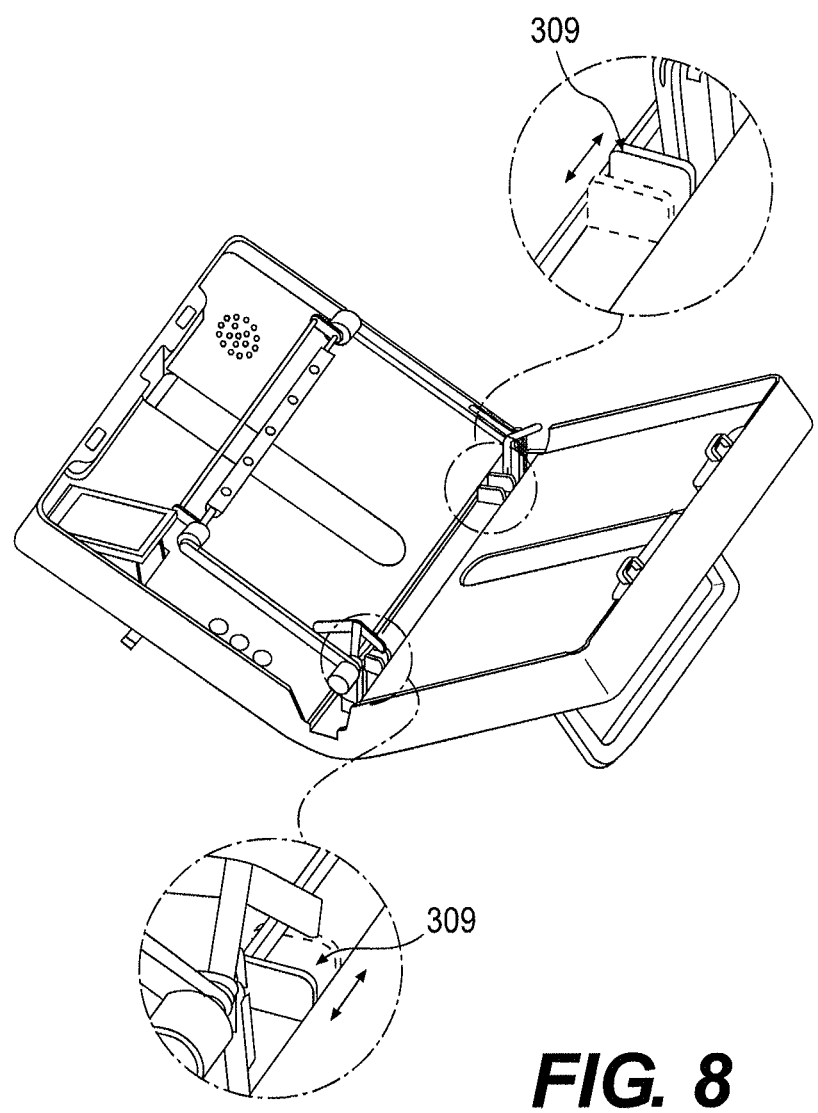
FIG. 8 depicts some of the device features, which allow for adjustability of the device to books of varying size.

FIG. 7 shows the rotating ability of the page turning rod 302. The rod is pinned to the rollers 303 by an extended tab, and pivots about the central axis by these tabs. The device will accommodate books of varying thickness. Pressing hinges 311, on the top and bottom of the device, are adjustable to secure a book in place on the device. They also act to press down on the book pages, to improve scanning quality, reducing ripple along the 'gutter' of the pages, and assist in providing as close to a platen surface as possible. Additionally, the device will accommodate books of varying size. Book clamp adjustment pieces 309 may be moved vertically among the device's center channel to secure a book's spine therein.

Figure 9:
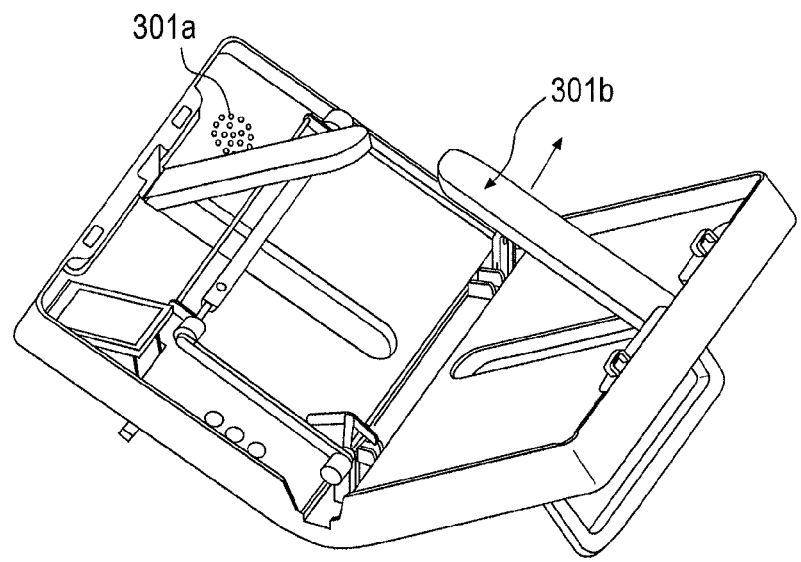
FIG. 9 depicts camera arms of an example device, in an extended position.

The device has a slim profile and is highly portable. As shown in FIG. 9, the camera arms 301 are stored in the sides of the device when not in use, and when needed, may be extended from the device sides to an extended position. The position of the extended camera arms may be lockable. Optionally, the camera arms may be further configurable, to allow for varying angles of extension of the camera arms, and the camera arms may be adjustable so as to adjust the height of the cameras.

Figure 10:
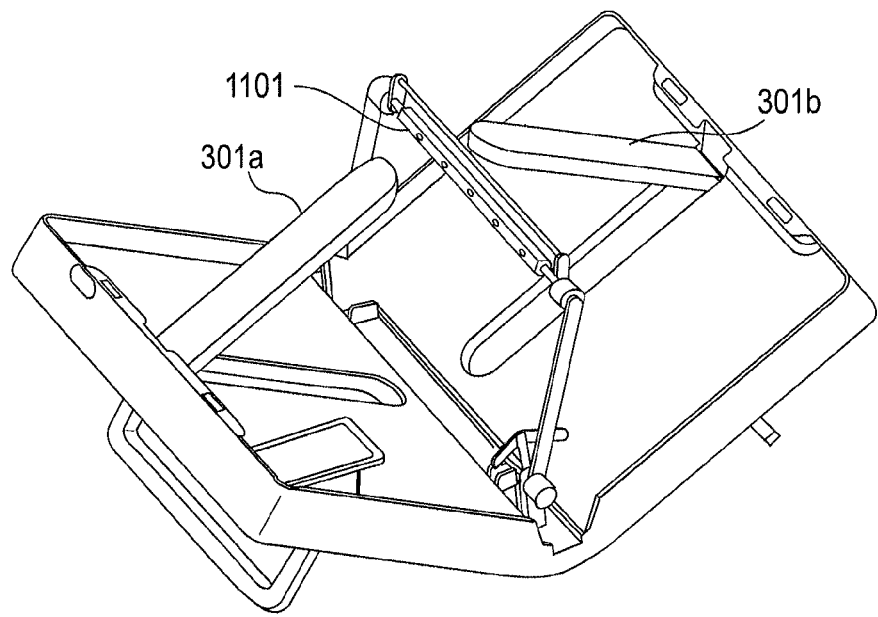
FIG. 10 depicts possible positioning of the page-turning arm with extended camera arms and a vacuum bar, of an example device.

FIG. 10 depicts possible positioning of the page-turning arm with extended camera arms and a vacuum bar 1101, of an example device. Page turning arm 1101 has full range of motion whether one or both cameras one in the operating position.

Figure 11:
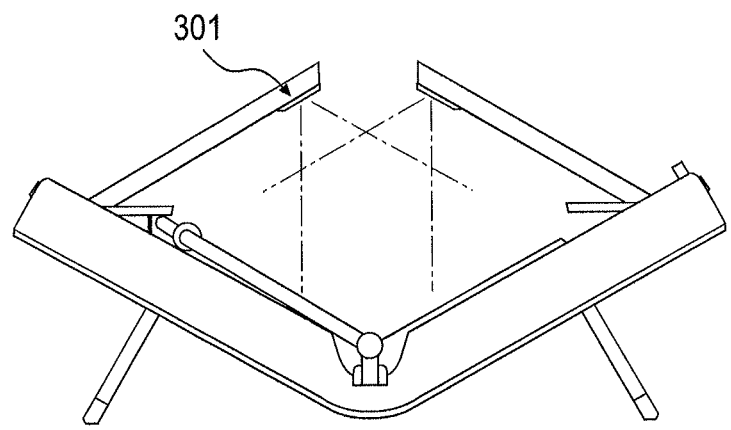
FIG. 11 depicts one example of camera viewing angles, upon extension of the camera arm(s).

FIG. 11 depicts one example of camera viewing angles, upon extension of the camera arm(s). In one embodiment, the camera arm is positioned to be parallel with the page to be captured, and sufficient to capture a full page in one image. For example, the field of view of the camera lens 1201 of the camera arm can be, at minimum, 69°. The flipping book machine support arms support the device and book therein in a position conducive to scanning. The position may be fixed, for example, at a 30° angle, or may be adjustable so as to obtain a preferred angle and field of view. In additional examples, the length of the camera arm(s) is adjustable and/or the camera lens has physical and/or digital zoom capability, so as to further enhance the adjustability of the device to scan books, pages and media of varying dimensions, thicknesses, types, etc. and meet various user preferences. For example, the user may desire that the captured image or scan is 'larger' than the book, page or media size itself, so as to have additional 'blank,' 'black,' or 'white' space. Optionally software may be used to manually or automatically trim portions of the image or scan deemed extraneous by the user, considered to be additional 'blank,' 'black,' or 'white' space, or to combine images or scans (i.e. to 'recreate' two adjacent 'face-up' pages of a book). These selections may be made using the operation buttons and/or the display screen of the device, may be performed by a personal computing device or other personal computing device connected to the device via USB or other physical or wireless connection to control the actions of the device, or may be performed in a 'post-processing step' after all desired pages or portions of a page, book or other media have been captured by the device.

FIGS. 12-22 depict an example sequence of actions corresponding to capturing of book pages and turning a book page to enable capture of subsequent book pages, employing the device configuration shown in FIG. 11

Figure 12:
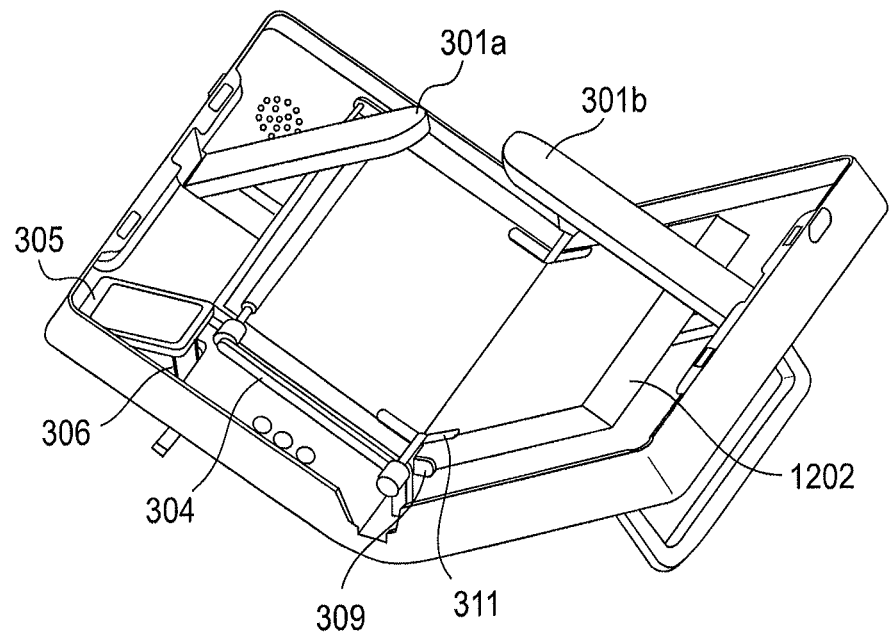
FIGS. 12-14b depict an example sequence of actions corresponding to capturing of book pages and turning a book page to capture subsequent book pages.

As seen in FIG. 12, the device is shown opened, and supported by its support arms in a semi-V position. A book has been placed in the device, so that its spine is supported by the book clamp adjustment pieces 309 at the book's top and bottom, and the pressing hinges 311 press at the top and bottom of the 'gutter' of the book so as to further secure the book in place on the device. The preview display screen 305, supported by its strut, allows easy view of the screen to the user from its position near the operation buttons.

The flipping page rod 302 and vacuum arm 315 are positioned at rest, so that the flipping page rod is in a 'high' position, and the vacuum arm has its vacuum nozzles adjacent the page, by the mechanical rocking arms, on the left side of the book, adjacent the page, while the two camera arms 301a and 301b have been positioned, each above an opposing page, to capture the desired page/images. In this first position, the desired image(s) may be captured by the camera(s). Capture of the desired image(s) may be manually prompted by the user, or may be automatic, upon detection by the device of the respective positions of the device components (i.e. upon detection that the flipping page rod and vacuum arm is positioned, on the left side of the book, the capture is made).

Subsequently, the device may be prompted manually, or automatically, to release the pressing hinges at the top and bottom of the book so as to enable flipping of the book's pages 1302. The degree to which the pressing hinges are released may be preset (i.e. fixed for each device, fixed for each operation of the device, inputted by the user at the beginning of operation) or adjustable, and may be manual (i.e. prompted by the user) or automatic (i.e. related to/calculated from the detected height of the flipping page rod and vacuum arm, from the number of pages scanned or to be scanned, etc.). Sequentially, or simultaneously, the vacuum arm activates so that its vacuum nozzles act on the page, providing sufficient vacuum and airflow to add tension to and lift the page (without damaging, overly stressing or overly-tensioning the page), while the mechanical rocking arm activates to move in a smooth and coordinated arc from the left side to the right side of the device, as seen in FIGS. 13-13d. The degree to which the pressing hinges are raised is sufficient to allow the page to clear the pressing hinges without damage.

Figure 13A:
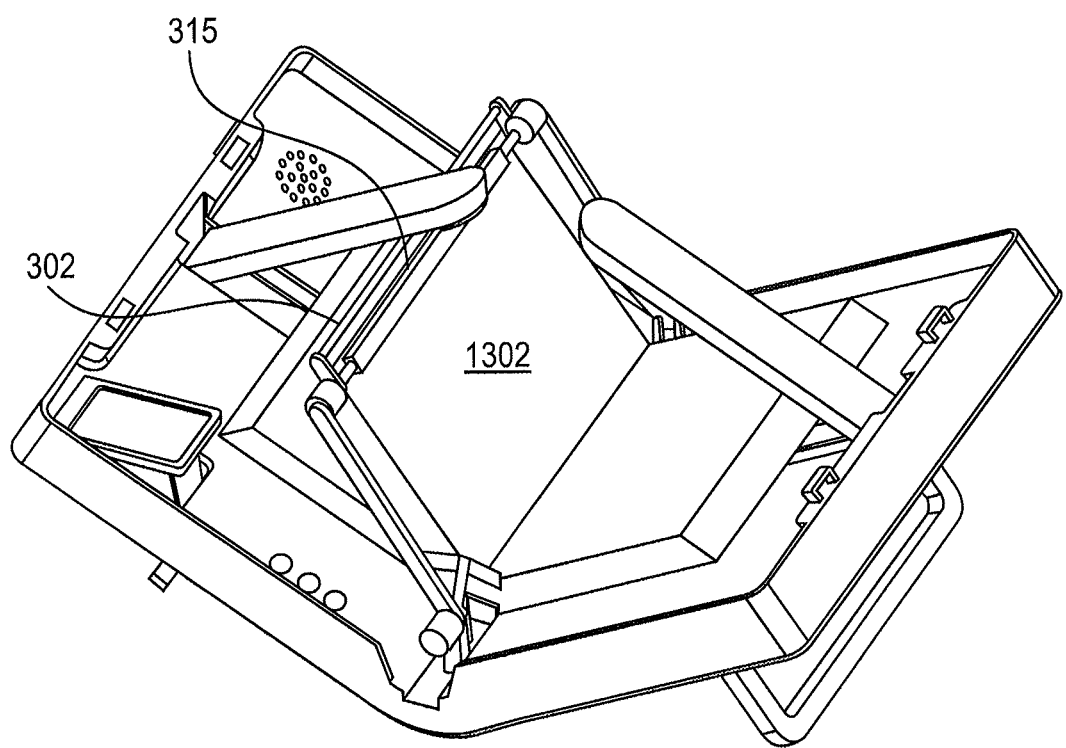
Figure 13B:
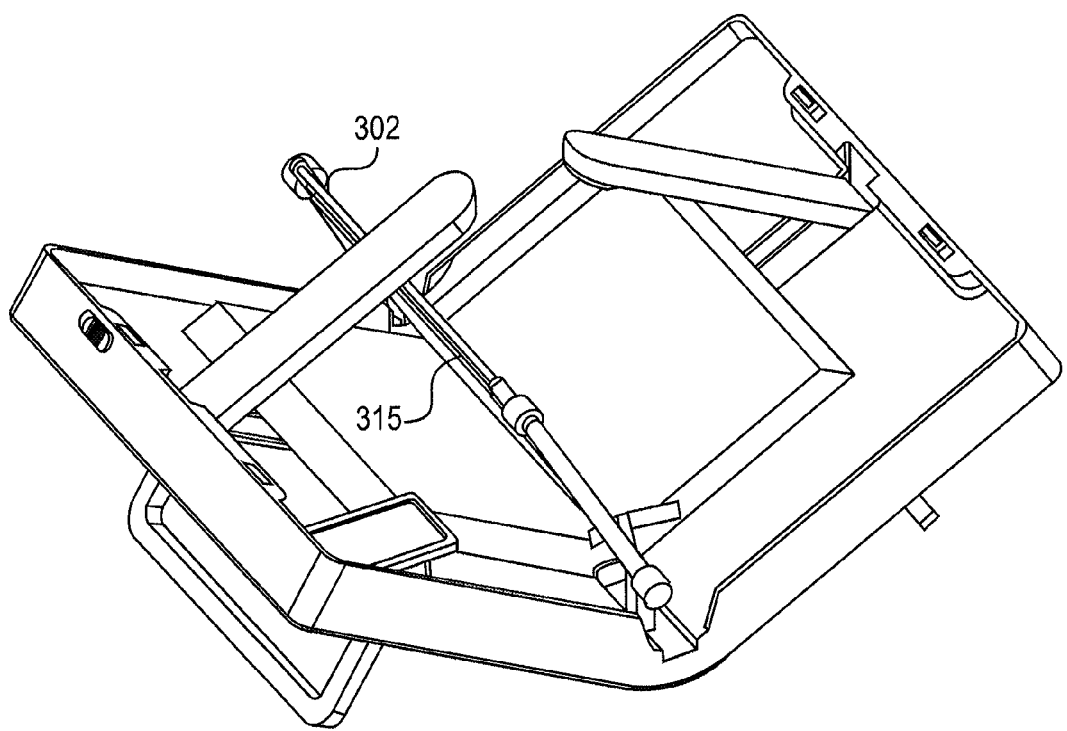
Figure 13C:
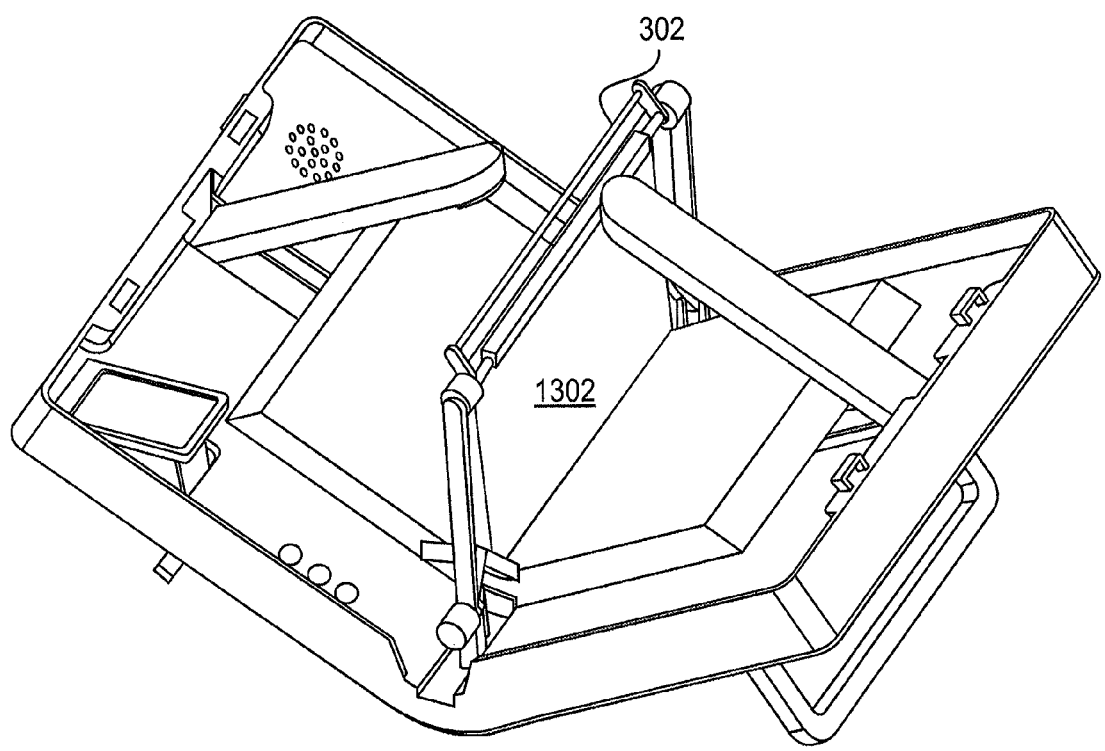
Figure 13D:
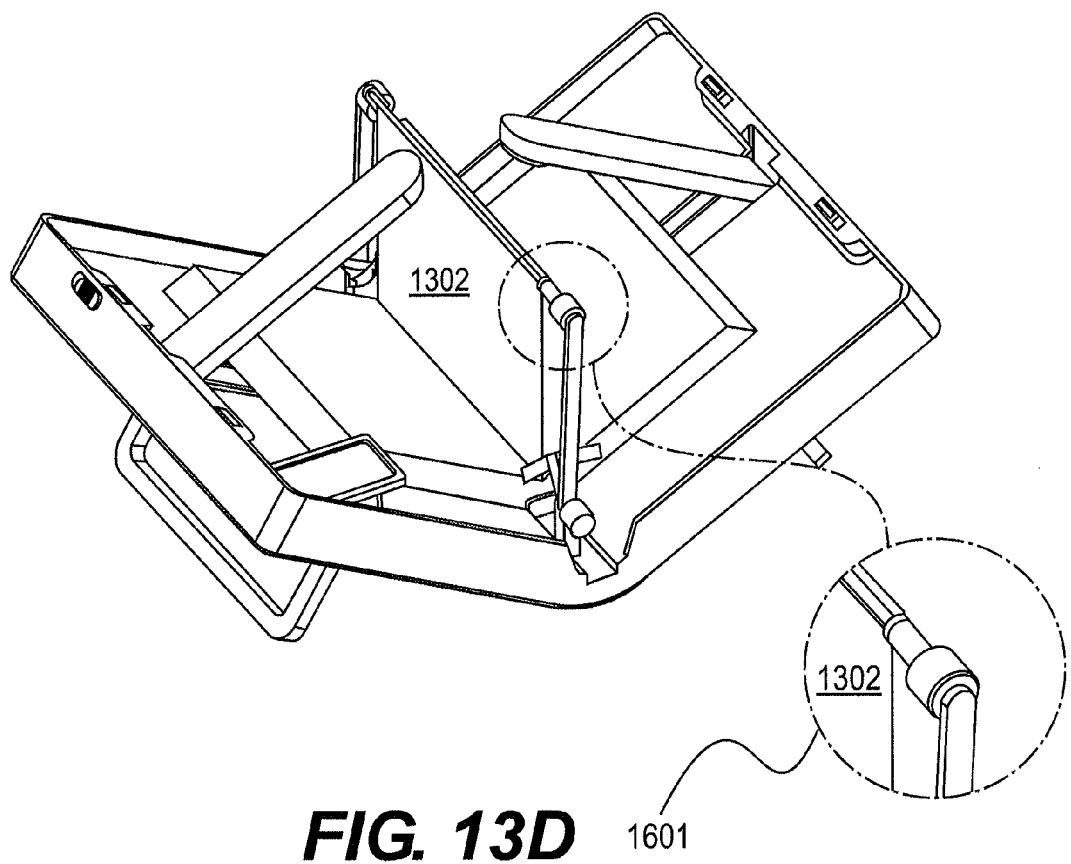
Figure 14A:
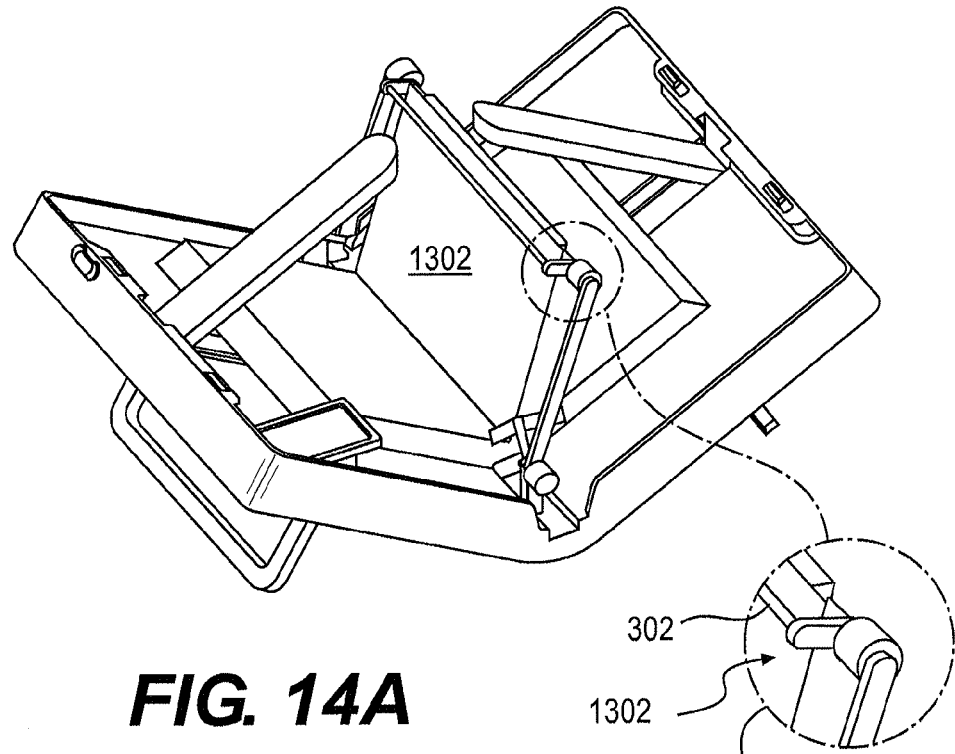
Figure 14B:
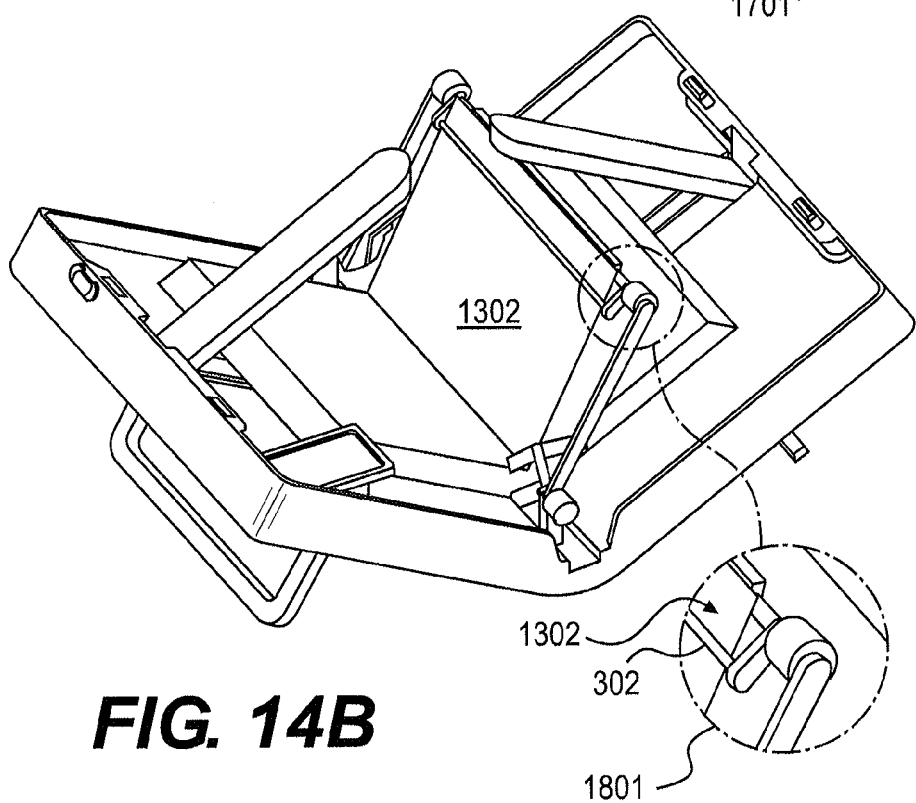

As seen in FIG. 13c, at least when the mechanical rocking arm (vacuum arm and flipping rod) is mid-way in its trajectory (i.e. when the vacuum arm and flipping rod are at their highest points, relative to the device, and the page 1302 is approximately vertical), although the vacuum arm 315 is static in its position and maintains the vacuum to hold the page, the flipping rod 302 begins to rotate, supported by the rollers as shown in the close-up of the flipping system 1601, to prepare to flip the page. The flipping rod 302 rotates in a controlled motion and speed from its 'high' position parallel to and above the vacuum arm 315, towards the left side of the device, toward the page surface. FIGS. 14a and 14b show the controlled rotating motion of the flipping rod, so that while the vacuum arm maintains its position and vacuum on the page and the mechanical rocking arm moves the page closer to the right side of the device, the flipping rod moves lower in position, until it is immediately adjacent to and touching the page 1302, as seen in FIG. 18. Then, the flipping rod continues to rotate, while the vacuum is diminished or turned off, so that the flexible page is pressed downwards and away from the vacuum arm 315, and while the mechanical rocking arm 302 continues to move in a downwards arc towards the right side of the device, until the flipping rod rests the page against the right side of the book. In this manner the device has effectively flipped or 'turned' the book's pages.

At this time, the pressing hinges may be replaced on the pages of the book. The flipping rod continues to rotate, until it resumes its 'high' position immediately above the vacuum arm. Another image capture can be made at this time, with the mechanical rocking arms positioned on the right side of the device or the user or device may wait to capture another image until the arms are re-positioned on the left side of the device.

Additionally, depending on the size of the book, the positioning of the book on the device, the angle of the support arms of the device, camera length, height, etc., it may be desired to have the vacuum and/or flipping arms of the device positioned at ½" to 1½" from the edge of the page to facilitate quick pivoting of the vacuum and flipping arms and enhance speed in turning of pages. However, the device is designed to accommodate a large range of book widths, lengths and thicknesses. In one embodiment, the vacuum and/or flipping arms of the device may be interchangeable with other additional vacuum and/or flipping arms of the device of varying lengths and widths, to accommodate books and media of varying sizes. In a further embodiment, the vacuum and/or flipping arms of the device may be adjustable in length and/or width so as to further enable adjustability without the need to exchange components of the device.

The figures and description above refer to a book or medium in which the pages are turned from the left to the right side of the book. This corresponds to reading in a right to left manner (i.e. the traditional binding of Asian books, such as Chinese, Korean or Japanese, in which the book is read from right to left). However, the device is not limited to this manner, and may be used with Western texts by adjusting the above-discussed configuration in any of a number of ways, for example, inverting the book, activating a right to left turn mechanism, in which the vacuum arm rotates to face the right portion of the page, etc. Accordingly, the device may be pre-configured for a default form of image capture or reading, or may be adjusted prior to each use for Eastern or Western texts.

The user may also optionally activate and configure the reading function(s) of the device, so that the device captures and reads or describes the pages/media in sequence, or one page at a time. The device may optionally contain additional permanent, replaceable or insertable memory/storage media of various sizes to further enable storage of captured images, OCR'd text and other media therein, and various combinations of image capture/reading. For example, the user may annotate or record comments regarding captured images or objects during or after device capture of a book/media. The device may optionally contain a built-in or added-on dictionary to describe or define objects or text that are captured using its cameras.

Optionally, the device may be configured to operate using voice commands, instead of or supplemental to the operation buttons.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It will be understood that many additional changes in the details, materials, steps and arrangement of parts, which have been herein described and illustrated to explain the nature of the invention, may be made by those skilled in the art within the principal and scope of the invention as expressed in the appended claims.

I claim:

1. A portable scanner for digitizing books comprising:
   a handheld and sealable binder case for supporting a book in an open position, the binder case comprising a first leaf and a second leaf joined to each other at a hinge;
   a first support member attached to the first leaf and a second support member attached to the second leaf, the support members configured to maintain the first leaf at an angle less than ninety degrees relative to a surface supporting the first leaf;
   at least one scanning device within an arm that is connected directly to one of the first or second leafs, the arm retractable to a position inside the binder case when the binder case is fully closed; and
   a page turning device configured to flip each page of a book to be scanned and maintain each page in a secure position.

2. A portable book scanner as recited in claim 1 further comprising a second scanning device connected to one of the first or second leafs.

3. A portable book scanner as recited in claim 1 further comprising a preview screen.

4. A portable book scanner as recited in claim 1 further comprising a first book press leaf.

5. A portable book scanner as recited in claim 4 further comprising a second book press leaf.

6. A portable book scanner as recited in claim 5 wherein the book press leafs are pivotable to allow for page turning.

7. A portable book scanner as recited in claim 1 further comprising a processor for optical character recognition.

8. A portable book scanner as recited in claim 7 further comprising a sound generating device for audibly reciting the contents of the book to be scanned.

9. An apparatus for capturing book and media images comprising: a handheld and sealable binder case for supporting a book in an open position; an imager comprising an arm within the binder case and a lens within an end of the arm; and a page flipping apparatus for automated turning or movement of pages or components, the page flipping apparatus comprising a rocking arm, the rocking arm comprising a vacuum arm and at least one roller arm,
   wherein the arm within the binder case is retractable to a position inside the binder case when the binder case is fully closed.

10. An apparatus as recited in claim 9 wherein the vacuum arm is configured to rotate three hundred and sixty degrees.

11. An apparatus of claim 10, further comprising a movement means comprising an air pump exhaust port, the exhaust port being in the binder case.

12. An apparatus of claim 10, further comprising a processor for scanning images obtained via the imager, the processor configured for scanning, digitization, optical character recognition.

13. An apparatus of claim 12, further comprising a speaker system for audible output of the content of the captured images.

14. An apparatus of claim 10, further comprising an image preview means.

15. An apparatus of claim 10, further comprising a connecting port for configuration with peripheral devices, components and machines.

16. An apparatus for capturing book and media images as recited in claim 9 further comprising a means for supporting a book in an open position.

17. An apparatus of claim 9, wherein the imager arm is extendible.

18. An apparatus of claim 9 further comprising a second arm within the binder case and a second lens on an end of the second arm.

* * * * *